(12) United States Patent
He et al.

(10) Patent No.: US 11,790,797 B2
(45) Date of Patent: Oct. 17, 2023

(54) METHODS TO INITIALIZE GROUND TAXI CLEARANCE DISPLAY

(71) Applicant: HONEYWELL INTERNATIONAL INC., Morris Plains, NJ (US)

(72) Inventors: Gang He, Morristown, NJ (US); Rui Wang, Beijing (CN)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 910 days.

(21) Appl. No.: 16/750,560

(22) Filed: Jan. 23, 2020

(65) Prior Publication Data

US 2021/0233419 A1    Jul. 29, 2021

(51) Int. Cl.
G08G 5/06       (2006.01)
G02B 27/01      (2006.01)
G08G 5/00       (2006.01)

(52) U.S. Cl.
CPC ............. *G08G 5/065* (2013.01); *G02B 27/01* (2013.01); *G08G 5/0013* (2013.01); *G08G 5/0021* (2013.01)

(58) Field of Classification Search
None
See application file for complete search history.

(56) References Cited

U.S. PATENT DOCUMENTS

| 7,818,100 B2 | 10/2010 | Goodman et al. |
| 8,401,775 B2 | 3/2013 | Rozovski et al. |
| 8,560,214 B1 | 10/2013 | Krenz et al. |
| 8,731,811 B2 | 5/2014 | Bilek et al. |
| 9,786,186 B2 | 10/2017 | Ball et al. |
| 10,001,376 B1 * | 6/2018 | Tiana .................... G01C 23/005 |
| 10,202,204 B1 * | 2/2019 | Daidzic .................... B64C 5/02 |
| 2008/0249675 A1 * | 10/2008 | Goodman ............. B64C 25/426 701/16 |

(Continued)

FOREIGN PATENT DOCUMENTS

| EP | 3200171 A1 | 8/2017 |
| EP | 3444791 A2 | 2/2019 |
| WO | 2014115139 A1 | 7/2014 |

OTHER PUBLICATIONS

Sam Clark and George Trampus, "Improving Runway Safety with Flight Deck Enhancements," www.boeing.com/commercial/aeromagazine, aero Quarterly, Qtr 01/11.

*Primary Examiner* — Adam D Tissot
*Assistant Examiner* — Garrett F Evans
(74) *Attorney, Agent, or Firm* — Lorenz & Kopf LLP

(57) ABSTRACT

A flight deck system and a method for providing a flight crew with a ground path to a destination at an aerodrome for taxiing is disclosed. The flight deck system includes a controller configured to: set a destination point on the ground at the aerodrome for an airborne aircraft that is preparing to land; estimate a stopping point for the aircraft on a runway; and predict a ground path for the aircraft to follow at the aerodrome from the runway to the destination point. To predict the controller is further configured to: determine a starting point on the runway for the predicted ground path; and determine a runway exit point to a taxiway. The controller is further configured to cause the predicted ground path to be displayed on a flight deck display device.

20 Claims, 4 Drawing Sheets

(56) References Cited

U.S. PATENT DOCUMENTS

| | | | |
|---|---|---|---|
| 2016/0140855 A1* | 5/2016 | Gannon | G08G 5/0021 |
| | | | 701/533 |
| 2019/0172361 A1* | 6/2019 | Schwindt | G08G 5/0021 |
| 2019/0392719 A1* | 12/2019 | Parker | G08G 5/0086 |
| 2021/0134167 A1* | 5/2021 | Erignac | G05D 1/0088 |

* cited by examiner

METHODS TO INITIALIZE GROUND TAXI CLEARANCE DISPLAY

TECHNICAL FIELD

Embodiments of the subject matter described herein relate generally to flight deck systems in an aircraft. More particularly, embodiments of the subject matter relate to systems and methods for aiding a flight crew with ground travel around an aerodrome.

BACKGROUND

Cockpit displays with an airport moving map (AMM) and taxi clearance information displayed to the flight crew are highly useful for day-to-day operations, particularly at complex and unfamiliar airports, and during reduced visibility conditions. During typical approach landing operations, the destination names such as gate, parking areas, or FBO are generally known from pre-planning or given by ATC and taxi clearance is given after touch down and clear of runway. This phase of operations from touch-down, to receiving taxi clearance, and then performing taxi operations accordingly can be a time of very high workload for the flight crew. Reducing the workload can reduce mishaps at an airport.

Hence, it is desirable to provide a system and method for reducing the workload of a flight crew while performing taxiing operations. Furthermore, other desirable features and characteristics of the present invention will become apparent from the subsequent detailed description and the appended claims, taken in conjunction with the accompanying drawings and the foregoing technical field and background.

SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

A flight deck system for providing a flight crew with a ground path to a destination at an aerodrome for taxiing is provided. The flight deck system includes a controller configured to: set a destination point on the ground at the aerodrome for an airborne aircraft that is preparing to land; estimate a stopping or targeted low speed point for the aircraft on a runway; and predict a ground path for the aircraft to follow at the aerodrome from the runway exit to the destination point. To predict, the controller is further configured to: determine a starting point on the runway for the predicted ground path and determine a runway exit point to a taxiway. The controller is further configured to cause the predicted ground path to be displayed on a flight deck display device.

A processor-implemented method for providing flight crew of an aircraft with a predicted ground path to a destination at an aerodrome for taxiing is provided. The method includes: setting a destination point on the ground at the aerodrome for the aircraft; estimating, by a processor, a stopping point for the aircraft on a runway; predicting, by the processor, an initial ground path for the aircraft to follow at the aerodrome from the runway to the destination point, wherein the predicting includes: determining, by the processor, a starting point on the runway for the predicted ground path; and determining, by the processor, a runway exit point to a taxiway. The method further includes causing, by the processor, the predicted ground path to be displayed on a flight deck display device.

Furthermore, other desirable features and characteristics will become apparent from the subsequent detailed description and the appended claims, taken in conjunction with the accompanying drawings and the preceding background.

BRIEF DESCRIPTION OF THE DRAWINGS

Embodiments of the subject matter will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding technical field, background, summary, or the following detailed description. As used herein, the term "module" refers to any hardware, software, firmware, electronic control component, processing logic, and/or processor device, individually or in any combination, including without limitation: application specific integrated circuit (ASIC), a field-programmable gate-array (FPGA), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the systems described herein is merely exemplary embodiments of the present disclosure.

For the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

The subject matter described herein discloses apparatus, systems, techniques and articles for displaying a taxi clearance path or plan within 2D and 3D AMM environments. The apparatus, systems, techniques and articles provided herein can facilitate flight crew workload reduction for entering taxi clearance information into the display system under high workload conditions.

Figure 1:
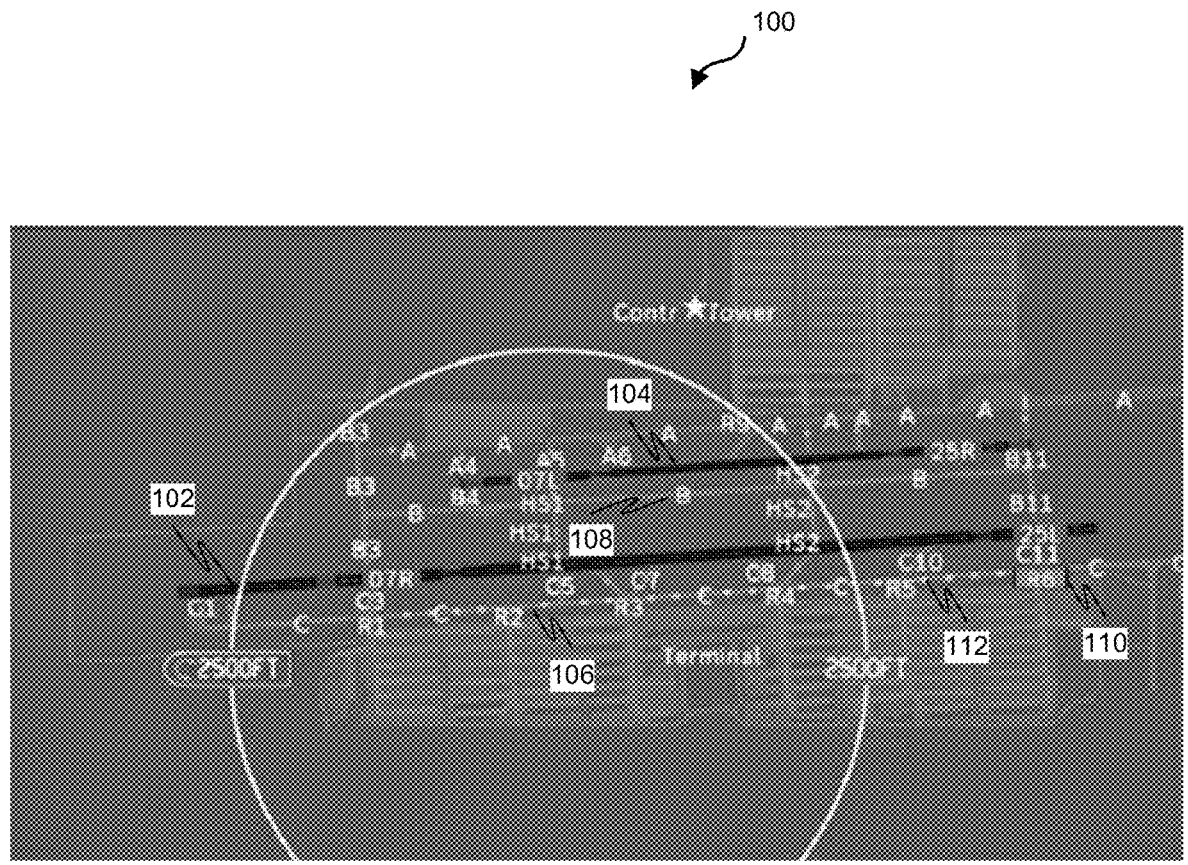
FIG. 1 is a map depicting an example operating environment at an airport or other aerodrome, in accordance with some embodiments.

FIG. 1 is a map depicting an example operating environment 100 at an airport or other aerodrome. The example operating environment 100 includes a plurality of runways including a first runway 102 and a second runway 104 on which an aircraft may land, a plurality of taxiways including a first taxiway 106 and a second taxiway 108 that the aircraft may use to move between runways and parking areas, and a plurality of exit points for allowing an aircraft to exit a runway onto a taxiway. When an aircraft is to land at the example operating environment 100, air traffic control may provide a specific destination point 110 to the flight crew. Alternatively, flight crews may know the destination point name as planned and can request a clearance to proceed to the point after landing and clear of runway. The flight crew, however, may not know where the destination point is within the airport environment or how to get to the destination point 110 and may need assistance with plotting a ground path to the destination point 110. The problem may be very acute when landing at an unfamiliar and busy airport requiring crews to set taxi operation in motion as soon as clear of runway in order not to disrupt airport operations and maintain safety. A ground taxi clearance display system described more fully below can provide the flight crew with a ground path 112 (shown as the dotted line) to follow to move the aircraft from a landing point to the destination point 110. The ground taxi clearance display system is configured to predict the landing point for the aircraft on a runway, the closest exit point from the runway after landing, and a ground path for the aircraft to follow to arrive at the destination point. The ground taxi clearance display system is further configured to cause the predicted ground path (shown as the dotted line) to be designated on a ground map displayed to the flight crew on a flight deck display device.

In this example, the current landing performance places the best exit point at C3 for taxiing to the destination point at R6. The predicted ground path is shown in a manner to indicate this is an estimated path. Upon receiving additional taxi clearance, the flight crew can add in one or more constraints or activate the initial path.

Figure 2:
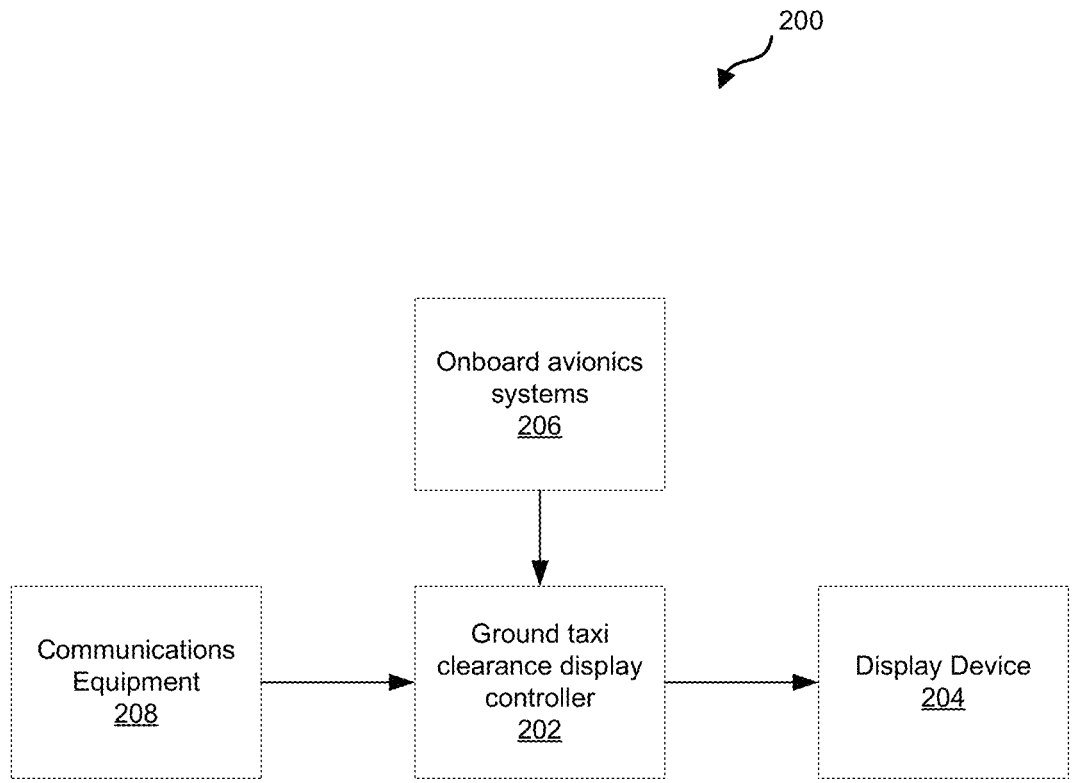
FIG. 2 is a block diagram depicting an example ground taxi clearance display system, in accordance with some embodiments.

FIG. 2 is a block diagram depicting an example ground taxi clearance display system 200. The example ground taxi clearance display system 200 includes a ground taxi clearance display controller 202 that is configured to cause an estimated taxi clearance path for the aircraft to follow from touch-down to taxiing to a destination point to be displayed on a map displayed on a flight deck display device 204. The example ground taxi clearance display controller 202 is configured to receive flight data from onboard avionics systems 206 and clearance information via pilot entry or directly from ATC clearance messages captured via communication equipment 208.

The example ground taxi clearance display controller 202 includes at least one processor and a computer-readable storage device or media encoded with programming instructions for configuring the controller. The processor may be any custom-made or commercially available processor, a central processing unit (CPU), a graphics processing unit (GPU), an application specific integrated circuit (ASIC), a field programmable gate array (FPGA), an auxiliary processor among several processors associated with the controller, a semiconductor-based microprocessor (in the form of a microchip or chip set), any combination thereof, or generally any device for executing instructions.

The computer readable storage device or media may include volatile and nonvolatile storage in read-only memory (ROM), random-access memory (RAM), and keep-alive memory (KAM), for example. KAM is a persistent or non-volatile memory that may be used to store various operating variables while the processor is powered down. The computer-readable storage device or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable programming instructions, used by the controller.

The example ground taxi clearance display controller 202 is configured to set a destination point on the ground for the aircraft at the aerodrome. The destination point on the ground may be entered by the flight crew after receiving ATC clearance or may be automatically set when clearance is received at the aircraft.

The example ground taxi clearance display controller 202 is configured to estimate a stopping point for the aircraft. The stopping point may be estimated based on current approach landing performance for the aircraft, the current approaching runway (potential source of approaching runway can be flight crew input, flight plan, or approaching runway detection algorithm), and other factors. The performance data for landing an aircraft can be obtained from the aircraft's flight manual or pilot's operating handbook. It should state the distance required to bring the aircraft to a stop under ideal conditions, assuming the aircraft crosses the runway threshold at a height of 50 ft, at the correct speed. The actual landing performance of an aircraft is affected by many variables which must be taken into account. Factors affecting landing performance include weight, density altitude, headwinds and tailwinds, runway surface, flap conditions, and others.

The example ground taxi clearance display controller 202 is configured to predict a ground path for the aircraft to follow at the aerodrome. Predicting a ground path may include determining a starting point on the runway for the predicted ground path and determining a runway exit point to a taxiway. A starting point for the predicted ground path may be determined from the estimated stopping point, runway conditions, typical aircraft performance settings, and other factors. The starting point may be the point on the runway at which the aircraft travel is slow and stable enough for the aircraft to complete a turn. The exit point may be the nearest exit point on the runway after the aircraft has reached a starting point. The example ground taxi clearance display controller 202 may predict a ground path by using a predetermined ground path from a taxiway to the destination point and determining where the aircraft is to enter the taxiway to traverse the predetermined ground path. In some operating scenarios, flight crews may select a specific runway exit point in order to use a specific taxi path to a destination. In this example, the selection of the exit point along the runway is to be compared with the predicted aircraft landing performance and stopping distance in order to be set as the useable exit point to taxi-path initialization.

The example ground taxi clearance display controller 202 is configured to cause the predicted ground path to be displayed on a flight deck display device for use by flight crew when taxiing. The predicted ground path may by overlaid on an AMM (aircraft moving map) and displayed in 2D (two dimensions) or 3D (three dimensions) on a flight deck display device. The flight deck display device may be a primary flight display (PFD), Navigation display (ND), heads up display (HUD), an electronic flight bag (EFB), a tablet computer, a wearable device, or some other device for displaying messages in an aircraft cockpit.

The example ground taxi clearance display controller 202 is configured to continue to update the predicted path until the aircraft has completed its landing. Before stopping has occurred, the example ground taxi clearance display controller 202 is configured to retrieve updated landing data (e.g., estimated touchdown point, runway conditions, typical aircraft performance settings, and other factors) when available, use the updated landing data to re-estimate the stopping point and predict the ground path by, among other things, re-determining the starting point and re-estimating the runway exit point.

After stopping, the example ground taxi clearance display controller 202 is configured to use updated landing data (e.g., actual touchdown point, runway conditions, typical aircraft performance settings, and other factors), when available, to re-predict a ground path for the aircraft to follow at the aerodrome including updating the starting point using real-time landing performance data and airport map data and re-estimating the taxiway exit point to determine starting point for the predicted ground path from the taxiway to the destination point based on the updated starting point. The example ground taxi clearance display controller 202 is further configured to cause the updated ground path to be displayed on the flight deck display device. If updated landing data is not available, the example ground taxi clearance display controller 202 is configured to continue to cause the predicted ground path to be displayed on the flight deck display device.

Figure 3:
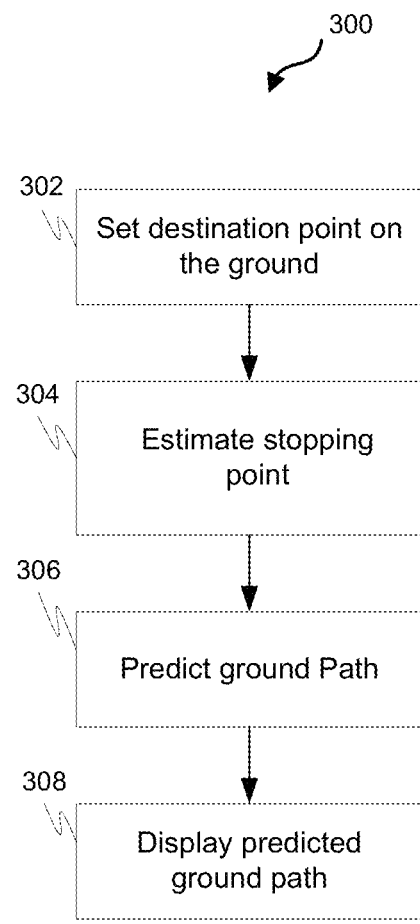
FIG. 3 is a process flow chart depicting an example process in an example ground taxi clearance display controller in an aircraft for providing flight crew with a ground path to a destination point on the ground at an aerodrome, in accordance with some embodiments.

FIG. 3 is a process flow chart depicting an example process 300 in an example ground taxi clearance display controller 202 in an aircraft for providing flight crew with a ground path to a destination point on the ground at an aerodrome. The order of operation within the process 300 is not limited to the sequential execution as illustrated in the figure, but may be performed in one or more varying orders as applicable and in accordance with the present disclosure.

The example process 300 includes setting a destination point on the ground for the aircraft at the aerodrome (operation 302). The destination point on the ground may be entered by the flight crew after receiving ATC clearance or may be automatically set when clearance is received at the aircraft.

The example process 300 includes estimating a stopping point for the aircraft (operation 304). The stopping point may be estimated based on current approach landing performance, current approaching runway (potential source of approaching runway can be flight crew input, flight plan, or approaching runway detection algorithm), and other factors.

The example process 300 includes predicting a ground path for the aircraft to follow at the aerodrome (operation 306). Predicting a ground path may include determining a starting point on the runway for the predicted ground path and determining a runway exit point to a taxiway. A starting point for the predicted ground path may be determined from the estimated stopping point, runway conditions, typical aircraft performance settings, and other factors. The starting point may be the point on the runway at which the aircraft travel is slow and stable enough for the aircraft to complete a turn. The exit point may be the nearest exit point on the runway after the aircraft has reached a starting point.

The example process 300 includes displaying the predicted ground path on a flight deck display device (operation 308) for use by flight crew when taxiing. The predicted ground path may by overlaid on an AMM (aircraft moving map) and displayed in 2D (two dimensions) or 3D (three dimensions) on a flight deck display device. The flight deck display device may be a primary flight display (PFD), Navigation display (ND), heads up display (HUD), an electronic flight bag (EFB), a tablet computer, or some other device for displaying messages in an aircraft cockpit.

Figure 4:
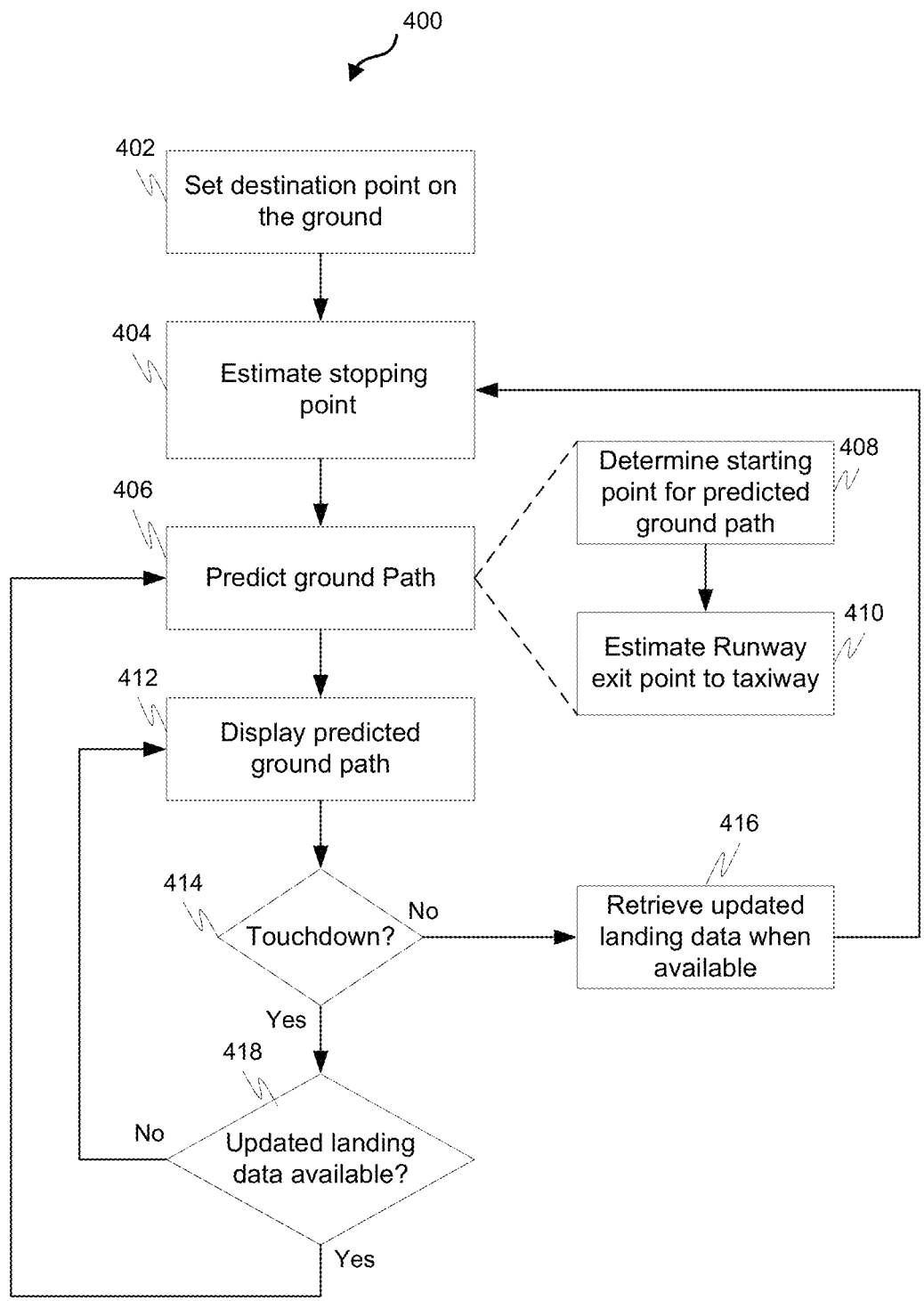
FIG. 4 is a process flow chart depicting another example process in an example ground taxi clearance display controller for providing flight crew with a ground path to a destination point on the ground at an aerodrome, in accordance with some embodiments.

FIG. 4 is a process flow chart depicting another example process 400 in an example ground taxi clearance display controller 202 for providing flight crew with a ground path to a destination point on the ground at an aerodrome. The order of operation within the process 400 is not limited to the sequential execution as illustrated in the figure, but may be performed in one or more varying orders as applicable and in accordance with the present disclosure.

The example process 400 includes setting a destination point on the ground for the aircraft at the aerodrome (operation 402). The destination point on the ground may be entered by the flight crew after receiving ATC clearance or may be automatically set when clearance is received at the aircraft. The destination point may also be entered prior to landing at a destination airport, for example, before takeoff from an origin airport when the flight crew knows before takeoff which parking area is to be used.

The example process 400 includes setting a stopping point for the aircraft (operation 404). The stopping point may be estimated based on current approach landing performance, current approaching runway (potential source of approaching runway can be flight crew input, flight plan, or approaching runway detection algorithm), and other factors. The stopping point may be a predicted stopping point or a real-time computed stopping point that is received from an external system.

The example process 400 includes predicting a ground path for the aircraft to follow at the aerodrome (operation 406). Predicting a ground path may include determining a starting point on the runway for the predicted ground path (operation 408) and determining a runway exit point to a taxiway (operation 410). A starting point for the predicted ground path may be determined from the estimated stopping point, runway conditions, typical aircraft performance settings, and other factors. The starting point may be the point on the runway at which the aircraft travel is slow and stable enough for the aircraft to complete a turn. The exit point may be the nearest exit point on the runway after the aircraft has reached a starting point.

The example process 400 includes causing the predicted ground path to be displayed on a flight deck display device (operation 412) for use by flight crew when taxiing. The predicted ground path may by overlaid on an AMM (aircraft moving map) and displayed in 2D (two dimensions) or 3D (three dimensions) on a flight deck display device. Causing the predicted ground path to be displayed on a flight deck display device may involve causing both the predicted ground path and an associated clearance to be displayed on the flight deck display device. Causing the predicted ground path to be displayed on a flight deck display device may involve causing the predicted ground path and associated clearance to be displayed on the AMM displayed on a flight deck display device. The flight deck display device may be a primary flight display (PFD), Navigation display (ND), heads up display (HUD), an electronic flight bag (EFB), a tablet computer, or some other device for displaying messages in an aircraft cockpit.

The example process 400 includes determining if touchdown has occurred (decision 414). If touchdown has not occurred (no at decision 414), the example process 400 includes retrieving updated landing data when available (operation 416), using the updated landing data to re-estimate the stopping point (operation 404), and continuing the example process 400. If touchdown has occurred (yes at decision 414), the example process 400 includes determining if updated landing data is available (decision 418). If updated landing data is available (yes at decision 418), the example process 400 includes using the updated landing data to re-predict a ground path for the aircraft to follow at the aerodrome (operation 406) including updating the starting point using real-time landing performance data and airport map data (operation 408), re-estimating the taxiway exit point to determine starting point for the predicted ground path from the taxiway to the destination point based on the updated starting point (operation 410), and continuing the example process 400. If updated landing data is not available (no at decision 418), the example process 400 includes continuing to display the predicted ground path on the flight deck display device.

Described herein are apparatus, systems, techniques and articles for providing a flight crew with a ground path to a destination at an aerodrome for taxiing. In one embodiment, a flight deck system for providing a flight crew with a ground path to a destination at an aerodrome for taxiing is provided. The flight deck system comprises a controller configured to: set a destination point on the ground at the aerodrome for an airborne aircraft that is preparing to land; set a stopping point for the aircraft on a runway; and predict a ground path for the aircraft to follow at the aerodrome from the runway to the destination point. To predict the controller is further configured to: determine a starting point on the runway for the predicted ground path; and determine a runway exit point to a taxiway. The controller is further configured to cause the predicted ground path to be displayed on a flight deck display device.

These aspects and other embodiments may include one or more of the following features. To set a stopping point the controller may be configured to estimate the stopping point and set the estimating stopping point as the stopping point. To set a stopping point the controller may be configured to receive a predicted stopping point or a real-time computed stopping point from an external system and set the received predicted or real-time computed stopping point as the stopping point. The controller may be further configured to: update the predicted ground path by updating the starting point using real-time landing performance data for the aircraft and airport map data and re-estimating the runway exit point to the taxiway based on the updated starting point; and cause the updated predicted ground path to be displayed on the flight deck display device. The controller may be further configured to: receive a pilot entered runway exit point as the starting point, wherein the pilot entered runway exit point is adjacent to or beyond the stopping point. The controller may be configured to update the predicted ground path using real-time landing performance data for the aircraft and airport map data. The controller may be configured to update the predicted ground path using the actual stopping point for the aircraft. The controller may be configured to re-determine the starting point and/or re-estimate the runway exit point using the actual stopping point for the aircraft. The controller may be configured to estimate the stopping point for the aircraft on the runway by estimating a stopping point for the aircraft on the runway using landing performance data for the aircraft and data regarding the current approaching runway. The controller may be configured to determine the starting point on the runway for the predicted ground path using the estimated stopping point, runway conditions, real-time landing performance data, and aircraft performance settings. The controller may be configured to cause an associated ground clearance to be displayed on the flight deck display device along with the predicted ground path. The controller may be configured to cause the predicted ground path and the associated ground clearance to be displayed on an airport moving map (AMM) displayed on a flight deck display device. The flight deck display device may comprise one of a primary flight display (PFD), Navigation display (ND), heads up display (HUD), an electronic flight bag (EFB), a tablet computer, a wearable device or any device that can be placed within the field of view of the flight crew at which to glance to view the computed or predicted path.

In another embodiment, a processor-implemented method for providing flight crew of an aircraft with a predicted ground path to a destination at an aerodrome for taxiing is provided. The method comprises: setting a destination point on the ground at the aerodrome for the aircraft; setting, by a processor, a stopping point for the aircraft on a runway; predicting, by the processor, an initial ground path for the aircraft to follow at the aerodrome from the runway to the destination point, wherein the predicting comprises: determining, by the processor, a starting point on the runway for the predicted ground path; and determining, by the processor, a runway exit point to a taxiway. The method further comprises causing, by the processor, the predicted ground path to be displayed on a flight deck display device.

These aspects and other embodiments may include one or more of the following features. Setting a stopping point may comprise estimating the stopping point for the aircraft on a runway. Setting a stopping point may comprise receiving a predicted stopping point or a real-time computed stopping point from an external system and set the received predicted or real-time computed stopping point as the stopping point. The estimating a stopping point for the aircraft on a runway may comprise estimating a stopping point for the aircraft on the runway using data regarding the current approach landing performance of the aircraft and data regarding the current approaching runway. The determining a starting point on the runway for the predicted ground path may comprise determining the starting point on the runway for the predicted ground path using the estimated stopping point, runway conditions, real-time landing performance data, and aircraft performance settings. The causing the predicted ground path to be displayed on a flight deck display device may comprise causing both the predicted ground path and the associated clearance to be displayed on the flight deck display device. The causing the predicted ground path to be displayed on a flight deck display device may comprise causing the predicted ground path to be overlaid on an airport moving map (AMM) displayed on a flight deck display device. The flight deck display device may comprise one of a primary flight display (PFD), Navigation display (ND), heads up display (HUD), an electronic flight bag (EFB), a tablet computer, a wearable device or any device that can be placed within the field of view of the flight crew at which to glance to view the computed or predicted path. The method may further comprise updating the initial ground path for the aircraft to follow at the aerodrome from the runway to the destination point based on updated current approach landing performance data for the aircraft. The method may further comprise updating the initial ground path for the aircraft to follow at the aerodrome from the runway to the destination point based on the actual stopping point for the aircraft. The method may further comprise re-determining the starting point and/or re-estimating the runway exit point based on the actual stopping point for the aircraft.

In another embodiment, a non-transitory computer readable media encoded with programming instructions configurable to cause one or more processors to perform a method is provided. The method comprises: setting a destination point on the ground at the aerodrome for the aircraft; estimating, by a processor, a stopping point for the aircraft on a runway; predicting, by the processor, an initial ground path for the aircraft to follow at the aerodrome from the runway to the destination point, wherein the predicting comprises: determining, by the processor, a starting point on the runway for the predicted ground path, and determining, by the processor, a runway exit point to a taxiway. The method further comprises causing, by the processor, the predicted ground path to be displayed on a flight deck display device; updating the ground path for the aircraft to follow at the aerodrome from the runway to the destination point based on updated current approach landing performance data for the aircraft; updating initial ground path for the aircraft to follow at the aerodrome from the runway to the destination point based on the actual stopping point for the aircraft; re-determining the starting point and/or re-estimating the runway exit point based on the actual stopping point for the aircraft; and causing the updated ground path to be displayed on the flight deck display device.

These aspects and other embodiments may include one or more of the following features. Setting a stopping point may comprise estimating the stopping point for the aircraft on a runway. Setting a stopping point may comprise receiving a predicted stopping point or a real-time computed stopping point from an external system and set the received predicted or real-time computed stopping point as the stopping point. The estimating a stopping point for the aircraft on a runway may comprise estimating a stopping point for the aircraft on the runway using data regarding the current approach landing performance of the aircraft and data regarding the current approaching runway. The determining a starting point on the runway for the predicted ground path may comprise determining the starting point on the runway for the predicted ground path using the estimated stopping point, runway conditions, real-time landing performance data, and aircraft performance settings. The causing the predicted ground path to be displayed on a flight deck display device may comprise causing both the predicted ground path and the associated clearance to be displayed on the flight deck display device. The causing the predicted ground path to be displayed on a flight deck display device may comprise causing the predicted ground path to be overlaid on an airport moving map (AMM) displayed on a flight deck display device. The flight deck display device may comprise one of a primary flight display (PFD), Navigation display (ND), heads up display (HUD), an electronic flight bag (EFB), a tablet computer, a wearable device or any device that can be placed within the field of view of the flight crew at which to glance to view the computed or predicted path. The method may further comprise updating the initial ground path for the aircraft to follow at the aerodrome from the runway to the destination point based on updated current approach landing performance data for the aircraft. The method may further comprise updating the initial ground path for the aircraft to follow at the aerodrome from the runway to the destination point based on the actual stopping point for the aircraft. The method may further comprise re-determining the starting point and/or re-estimating the runway exit point based on the actual stopping point for the aircraft.

Those of skill in the art will appreciate that the various illustrative logical blocks, modules, circuits, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A flight deck system for providing a flight crew with a ground path to a destination at an aerodrome for taxiing, the flight deck system comprising a controller configured to:
    set a destination point on the ground at the aerodrome for an airborne aircraft that is preparing to land;
    set a stopping point for the aircraft on a runway;
    predict a ground path for the aircraft to follow at the aerodrome from the runway to the destination point, to predict the controller is further configured to:
        determine, on the runway for the predicted ground path, a starting point at which aircraft travel is slow and stable enough for the aircraft to complete a turn, wherein the starting point is determined based on the stopping point; and
        determine from a plurality of potential runway exit points, a proposed runway exit point to a taxiway that is estimated to be arrived at first by the aircraft after the aircraft reaches the starting point; and
    cause the predicted ground path to be displayed on a flight deck display device.

2. The flight deck system of claim 1, wherein to set a stopping point the controller is configured to estimate the stopping point.

3. The flight deck system of claim 1, wherein to set a stopping point the controller is configured to receive a predicted stopping point or a real-time computed stopping point from an external system.

4. The flight deck system of claim 1, wherein the controller is further configured to:
    update the predicted ground path by updating the starting point using real-time landing performance data for the aircraft and airport map data, and re-estimating the proposed runway exit point to the taxiway based on the updated starting point; and
    cause the updated predicted ground path to be displayed on the flight deck display device.

5. The flight deck system of claim 1, wherein the controller is further configured to: receive a pilot entered runway exit point as the starting point, wherein the pilot entered runway exit point is adjacent to or beyond the stopping point.

6. The flight deck system of claim 1, wherein the controller is configured to update the predicted ground path using real-time landing performance data for the aircraft and airport map data.

7. The flight deck system of claim 1, wherein the controller is configured to update the predicted ground path using an actual stopping point for the aircraft.

8. The flight deck system of claim 1, wherein the controller is configured to re-determine the starting point and/or re-estimate the proposed runway exit point using an actual stopping point for the aircraft.

9. The flight deck system of claim 2, wherein the controller is configured to estimate the stopping point for the aircraft on the runway using landing performance data for the aircraft and data regarding a current approaching runway.

10. The flight deck system of claim 1, wherein the controller is configured to determine the starting point on the runway for the predicted ground path using the stopping point, runway conditions, real-time landing performance data, and aircraft performance settings.

11. The flight deck system of claim 1, wherein the controller is configured to cause an associated ground clearance to be displayed on the flight deck display device along with the predicted ground path.

12. The flight deck system of claim 8, wherein the controller is configured to cause the predicted ground path and an associated ground clearance to be displayed on an airport moving map (AMM) displayed on a flight deck display device.

13. The flight deck system of claim 1, wherein the flight deck display device comprises one of a primary flight display (PFD), Navigation display (ND), heads up display (HUD), an electronic flight bag (EFB), a tablet computer, or a wearable device.

14. A processor-implemented method for providing flight crew on an aircraft with a predicted ground path to a destination at an aerodrome for taxiing, the method comprising:
    setting a destination point on the ground at the aerodrome for the aircraft;
    setting, by a processor, a stopping point for the aircraft on a runway;
    predicting, by the processor, a ground path for the aircraft to follow at the aerodrome from the runway to the destination point, the predicting comprising:
        determining, by the processor on the runway for the predicted ground path, a starting point at which aircraft travel is slow and stable enough for the aircraft to complete a turn, wherein the starting point is determined based on the stopping point; and determining, by the processor, from a plurality of potential runway exit points, a proposed runway exit point to a taxiway that is estimated to be arrived at first by the aircraft after the aircraft reaches the starting point; and causing, by the processor, the predicted ground path to be displayed on a flight deck display device.

15. The method of claim 14, wherein setting a stopping point comprises estimating the stopping point for the aircraft on a runway.

16. The method of claim 15, wherein the estimating the stopping point for the aircraft on a runway comprises estimating a stopping point for the aircraft on the runway using data regarding current approach landing performance of the aircraft and data regarding a current approaching runway.

17. The method of claim 14, wherein the determining a starting point on the runway for the predicted ground path comprises determining the starting point on the runway for the predicted ground path using the stopping point, runway conditions, real-time landing performance data, and aircraft performance settings.

18. The method of claim 14, further comprising updating the predicted ground path for the aircraft to follow at the aerodrome from the runway to the destination point based on updated current approach landing performance data for the aircraft.

19. The method of claim 14, further comprising updating the predicted ground path for the aircraft to follow at the aerodrome from the runway to the destination point based on an actual stopping point for the aircraft.

20. A non-transitory computer readable media encoded with programming instructions configurable to cause one or more processors to perform a method, the method comprising:

setting a destination point on the ground at an aerodrome for an aircraft;

estimating, by a processor, a stopping point for the aircraft on a runway;

predicting, by the processor, a ground path for the aircraft to follow at the aerodrome from the runway to the destination point, the predicting comprising:

determining, by the processor on the runway for the predicted ground path, a starting point at which aircraft travel is slow and stable enough for the aircraft to complete a turn, wherein the starting point is determined based on the estimated stopping point; and determining, by the processor, from a plurality of potential runway exit points, a proposed runway exit point to a taxiway that is estimated to be arrived at first by the aircraft after the aircraft reaches the starting point;

causing, by the processor, the predicted ground path to be displayed on a flight deck display device;

updating the predicted ground path for the aircraft to follow at the aerodrome from the runway to the destination point based on updated current approach landing performance data for the aircraft;

updating the predicted ground path for the aircraft to follow at the aerodrome from the runway to the destination point based on an actual stopping point for the aircraft;

re-determining the starting point and/or re-estimating the proposed runway exit point based on the actual stopping point for the aircraft; and causing the updated ground path to be displayed on the flight deck display device.

* * * * *